3,014,801
PROCESS FOR THE PREPARATION OF A WHIPPING AGENT FROM CEREAL PROTEIN

Cyril Harry Evans, Cambridge, England, assignor to Spillers Limited, London, England, a British company
No Drawing. Filed Feb. 17, 1959, Ser. No. 793,671
Claims priority, application Great Britain Feb. 18, 1958
11 Claims. (Cl. 99—17)

This invention relates to food products prepared from wheat or other cereal proteins and associated substances. The ground cereal, flour, particularly wheat flour, bran or the gluten extracted from wheat flour are suitable materials from which the food products can be prepared.

The products of the invention, which are soluble, may be separated from the starch and other susbtances of the cereal grain and used, either in solution or in solution reconstituted from dried matter obtained from the solution resulting from the process of the invention, as substitutes for egg albumen in the production of aerated producs and also for some uses in confectionery. Alternatively the products may be made directly into food products without the removal of accompanying starch and other substances of the cereal grain.

Egg albumen, either in the natural liquid state after separation from the yolk or reconstituted from powder obtained by drying the natural albumen, is a most important food product as in addition to its nutritive value it is soluble and possesses the ability to form stable foams with which sugar can be incorporated and also coagulates on heating, thereby forming a structure which will support, for example flour or sugar to produce various confectionery products.

Egg albumen also has some disadvantages. It is comparatively expensive and usually the most expensive ingredient in confectionery. The keeping properties of the natural albumen are poor and necessitate either refrigeration or desiccation and moreover infection with microorganisms sometimes makes the albumen a danger to health. The whipping properties are also not ideal. The quality varies as with all natural products and the whipping may be a slow process and needs a certain amount of skill as once the albumen is denatured the process cannot be reversed and the solution again whipped up.

The whipping properties are also interferred with by the presence of flour and this causes difficulty in many baking processes. It is, for example, usually necessary to whip the eggs to a foam before adding flour, and even sugar needs to be added with discretion. Very often too, egg white needs to stand before use so as to allow some maturation and additions of acid may be necessary. Some aerated goods, such as meringues, are too fragile when made with egg albumen alone and it is usually necessary to add such substances as starch, gums, gelatin and certain inorganic sulphates such as magnesium sulphate to make up the so-called "Meringue Powers" used for commerical meringues.

It is therefore not surprising that many attempts have been made to make substitutes for egg albumen from other proteins. It has been proposed to make such products from animal proteins using blood, fish or milk and also to use plant proteins such as those of linseed, haricot beans and particularly soya beans. It has also been proposed to use substances which are not proteins and not of natural origin, such as methyl ethyl cellulose, which are much more powerful foaming agents, but have no food value.

There have been two principal methods employed in making albumen substitutes from natural sources. The first comprises the extraction of a suitable substance with a solvent to produce the required material or the removal of undesirable substances to leave a residue with foaming properties; and the second comprises the modification of a protein not in itself a suitable substance by chemical means such as hydrolysis.

Very often the second method is complicated by the presence of undesirable substances such as oil in plant seeds or tissues in animal matter so that the processes of the first method have to be used additionally.

As examples of the first method it has been proposed to extract wheat germ with an organic solvent to remove oil and other fatty substances and then to use the residue as a foaming or whipping product and to extract soya bean meal or wheat germ with water and to use the extract which contains the required substances. Such products have found limited use and the second method, particularly where milk protein and soya bean protein have been modified by hydrolysis with acid or alkali or with various enzymes, has produced more effective materials.

However, many of these egg albumen substitutes have disadvantages. Fish products are prone to a slight fishy taste or odour which is most difficult to eradicate. Soya beans contain a bitter compound and a "beany" taste is often noticed in soya products. Animal serum presents difficulty in collection. Some of the milk proteins are free from these particular difficulties, but produce aerated goods, such as meringues, with a rough chalky exterior. Such egg albumen substitutes are usually more powerful foaming agents than egg albumen which requires a concentration of from 12–15% dry matter to produce a stable foam. Soya products are effective at about a 10% concentration; milk products at about 7½% and cellulose ethers with as little as 2½% concentration will make stable foams with sugar, although the baked goods are often of a weak over-aerated nature and lack body.

It will be appreciated that the proteins are very complex natural compounds and as yet imperfectly understood. Proteins are usually divided into groups, the members of which have similar properties and form similar products when the proteins are broken up into simpler products as for instance by hydrolysis. Protein groups or classifications which have yielded foaming products are albumins, globulins and phospho-proteins. Egg albumen, blood and fish albumin belong to the albumin group and are soluble in water, but whilst egg and blood albumins coagulate with heat the fish albumin as produced for egg albumin substitutes does not. Soya beans contain principally a protein of the globulin group, glycinin, which is soluble, but not heat coagulable. Milk contains both an albumin, lactalbumin, a globulin, lactoglobulin and a phospho-protein, casein, which forms the largest part of the protein. Both lactalbumin and lactoglobulin are soluble and coagulated by heat, but casein is only slightly soluble and is not coagulated by heating.

However, the cereals contain only small quantities of the protein groups which have been used as whipping products and the principal proteins are those belonging to the prolamine or gliadin group and the glutenin group. Wheat contains both gliadin and a glutelin, glutenin. These proteins associated with a certain amount of fatty matter and other substances such as carbohydrates make up the gluten which can be extracted from dough by washing with water. Rye protein is largely gliadin, barley contains another gliadin, "hordein," and maize contains both a gliadin "zein" and a glutelin. The glutelin "oryzenin" is found in rice and another glutelin "avenin" in oats which, however, contain other proteins of doubtful classification. Most of the gliadins and glutelins are coagulated by heat and none is appreciably soluble in water.

It will be understood that by "soluble" we include colloidal solution or dispersion by peptization and do not intend to imply necessarily true solution.

We have now discovered that it is possible to obtain from wheat and other cereals soluble products which have excellent whipping qualities and which are able to produce stable foams, particularly with sugar, when used in quantities very much less than those needed by most known substances.

According to the present invention therefore a process is provided which comprises digesting the cereal protein with water containing lime.

In this process one may use for example the whole grain ground to a meal, flour obtained by bolting, bran or extracted protein such as gluten.

In a preferred embodiment of the invention the material to be treated is dispersed in water containing lime and then digested in the cold. During this process the protein is modified, probably by hydrolysis, so that a part of the insoluble protein becomes soluble and small quantities of ammonia or related substances and also very small quantities of sulphur compounds are formed. If the process is continued too long the soluble protein continues to undergo modification and eventually loses its desirable qualities. Thus, for example in the case of gluten extracted from wheat flour there is little action in the first hour, after three hours there is a useful product, after six hours there is a slightly better concentration and there is then very little change up to 24 hours. After this the product is not quite as good but it can be kept for several days with only the risk of bacterial infection and general putrefaction although this is long delayed. It is therefore necessary to control the process so as to stop the reaction when the desired products have been obtained and then to remove any undesired products and preserve the foaming products in a stable and, if desired, dry condition.

Unlike the proteins of the other classifications such as animal albumins from fish or globulins from legumes such as soya beans, it is not necessary to remove oil by previous extraction. Neither is it necessary or even desirable to use strong alkalies or acids and to make the digestion at or above the boiling point of water, or even to digest in the cold with a mild alkali such as lime for a period of several days.

Lime (calcium hydroxide) is only very slightly soluble in water, less than two parts in a thousand dissolve in very cold water and about half this amount in boiling water. A saturated solution of lime has a pH of about 12 and this degree of alkalinity is satisfactory for the digestion. The pH falls as the reaction proceeds and thus exerts a measure of control unless an excess of lime is present to maintain the pH. When the process is used with ground cereals or flour made from cereals, the degree of protein modification obtained with a saturated lime solution is sufficient to give good foaming properties and such products may be used without removal of the insoluble protein and starch, etc., to make baked products of aerated texture which may incorporate sugar or other ingredients. The amount of lime remaining is innocuous and undesirable substances are negligible.

However, when it is desired to produce foaming agents free from the insoluble protein and starch, etc., it is preferred either to concentrate the protein by repeated extraction of the meal or flour or to use extracted protein, such as gluten, and the amount of lime should be at least ten times the amount necessary to saturate the solution, not only to maintain the pH and to provide for a certain amount of calcium which appears to combine with the soluble protein, but to improve the production. The reason for the excess of lime is not properly understood but surface or adsorption phenomena may play a part. Larger quantities of lime are slightly more effective, but uneconomic.

The invention will be more clearly understood by reference to the following examples which are purely illustrative. Example 1 illustrates the manufacture of aerated cereal products without the separation of the starch and other non-protein substances and the other examples illustrate the production of soluble substances capable of acting as excellent egg albumen substitutes.

*Example 1*

Forty parts of flour containing approximately 10% of protein are suspended in 200 parts of cold saturated calcium hydroxide solution and allowed to digest for a period of from four to six hours. Agitation of the mixture is made either continuously or at intervals with a suitable mechanical device so arranged as not to incorporate air and thus produce foam. At the end of this time the mixture is beaten into a stiff foam and sufficient sugar, say 200 parts, is added and the product baked. Meals made by grinding wheat, barely, rice, oats, maize, rye produce aerated products when treated in this way. The quantities used should take account of the protein content of the cereal so as to produce in the mixture a minimum of about 2% protein. The baked products can be varied from dense or lightly aerated goods similar to biscuits, to very voluminous or highly aerated products like meringues by increasing the digestion period up to as long as 24 hours and maintaining the pH of the solution by the addition of more lime at intervals.

*Example 2*

Forty parts of wheat bran, preferably ground, are mixed with 200 parts of water and about two parts of lime and allowed to stand in the cold for periods up to 24 hours, after which the liquid may be filtered and used either directly or after conversion to a dried powder for the preparation of aerated products. Alternatively, the whole mass after dilution if necessary, may be beaten to foam and baked, with or without the addition of sugar or other ingredients, to form an aerated product.

*Example 3*

Forty parts of flour are suspended in 200 parts of water with the addition of an excess of lime, which may be up to ten times the amount necessary to saturate the solution, for example 2 parts by weight. The mixture is allowed to digest for a period of 24 hours with agitation as described in Example 1. The mixture is then centrifuged to remove the starch and excess lime. The solution produced is then of about the foaming strength of egg white and can be used directly for many purposes such as the production of meringues.

*Example 4*

A hundred parts of wet gluten are dispersed in about 230 parts of water containing 2–3 parts of lime by means of a high agitator, either in vacuo or in such a manner as to prevent the formation of foam. The mixture is kept agitated for periods up to 24 hours. A separation of the insoluble protein is then effected by centrifuging and the clear solution contains the soluble protein. This may be diluted and used directly, but it is preferred to concentrate the solution under reduced pressure and then spray dry so as to obtain a powder. This powder contains soluble substances other than proteins and if desired these may be removed by making the solution obtained by centrifuging acid, so precipitating the protein and afterwards re-dissolving in lime solution or in a solution containing a little caustic alkali and lime. Traces of ammonia or amines which are produced in small quantities during the digestion are removed during the concentration or the spray drying. If, however, it is desired to use the liquid without concentrating or drying, the pH may be adjusted without precipitating the protein and this procedure will remove any excess of alkalinity. Some cereals produce certain sulphur compounds which it is desirable to remove and this is achieved by the addition of a trace of dilute hydrogen peroxide before the liquid is whisked to produce aerated goods. However, when the process is used without the removal of starch or bran, as when flour or ground cereals are used with the minimum lime content for the short periods mentioned, these precautions are seldom necessary.

The egg albumen substitute which may be either the clear liquid obtained after centrifuging diluted so as to contain about 2½% of protein or a liquid reconstituted by dissolving the spray dried powder to a similar concentration, has the following advantages in use. The foams are produced very quickly and are extremely stable. The foams are also reversible and may be re-beaten if necessary and the concentrations required indicate a strength even greater than that of the cellulose ethers and from three to four times those of the milk and soya protein products. The aerated products are of an intense white colour and not chalky in appearance, as is the case with many egg albumen substitutes, and also very similar in eating qualities to goods produced from egg albumen. Moreover, the cereal egg albumen substitutes may be produced in a sterile condition. On heating these products coagulate much in the same way as egg albumen and this is an advantage unobtainable with any other egg albumen substitute with the possible exception of animal serum. Moreover, these substitutes are very cheap, particularly when the process is linked with starch manufacture, so that the gluten, which is often of little value as a by-product, is the material used. The solutions will keep for several weeks particularly if heat treatment is given to inactivate the enzymes and the dried material will keep indefinitely.

I claim:

1. Process for the preparation of a whipping agent which comprises digesting a cereal protein with a saturated aqueous solution of lime in excess for from 3 to 24 hours whereby a soluble portion constituting said whipping agent and an insoluble portion are formed, and thereafter separating out said insoluble portion.

2. Process as claimed in claim 1 in which the cereal protein is contained in whole grain ground to a meal.

3. Process as claimed in claim 2 in which the meal is a member selected from the group consisting of wheat meal, rye meal, barley meal, oat meal, rice meal and maize meal.

4. Process as claimed in claim 1 in which the cereal protein is contained in flour obtained by bolting.

5. Process as claimed in claim 1 in which the cereal protein is contained in bran.

6. Process as claimed in claim 1 in which the cereal protein is wheat gluten.

7. Process as claimed in claim 1 in which the cereal protein is first dispersed in said lime and then digested in said lime in the cold.

8. Process as claimed in claim 6 in which the lime is used to maintain a pH of about 12.

9. Process as claimed in claim 8 in which the water contains an amount of lime at least ten times the amount necessary to saturate the solution.

10. Process as claimed in claim 1 in which the reaction product is converted into a powder.

11. Process as claimed in claim 1 in which the soluble portion is rendered acid thus precipitating protein which is then redissolved by means of water containing lime, the solution so obtained being concentrated under reduced pressure and then spray dried.

References Cited in the file of this patent

UNITED STATES PATENTS

| | | |
|---|---|---|
| 2,232,052 | Cummins | Feb. 18, 1941 |
| 2,554,479 | Wolff | May 22, 1951 |

FOREIGN PATENTS

| | | |
|---|---|---|
| 670,413 | Great Britain | Apr. 16, 1952 |
| 670,450 | Great Britain | Apr. 16, 1952 |